Feb. 6, 1962
E. E. SUCKLING
3,020,114
DEVICE FOR RECORDING BALANCE POINT OF
ELECTRICAL BRIDGE CIRCUITS
Filed Nov. 9, 1960
2 Sheets-Sheet 1
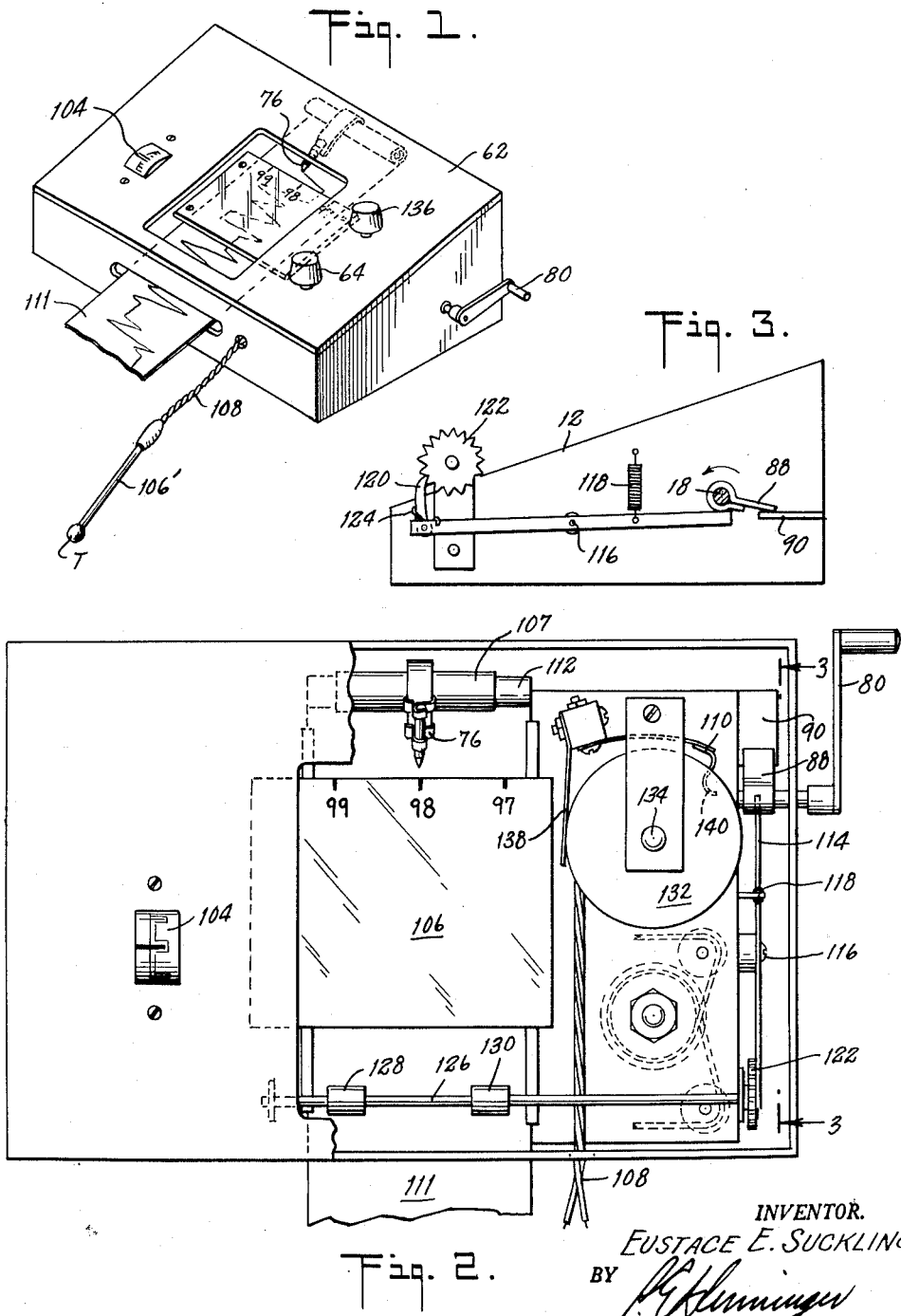
INVENTOR.
EUSTACE E. SUCKLING
BY
ATTORNEY

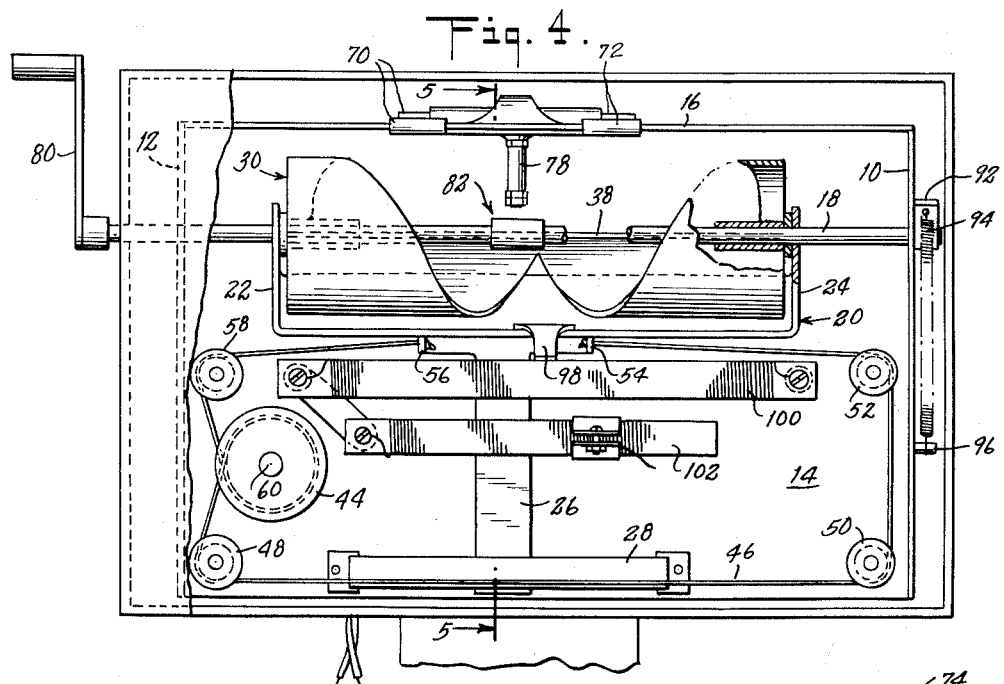
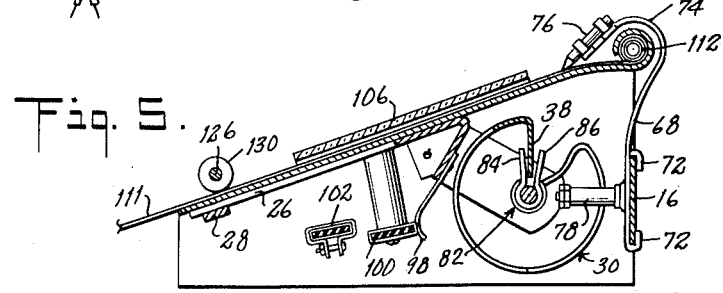
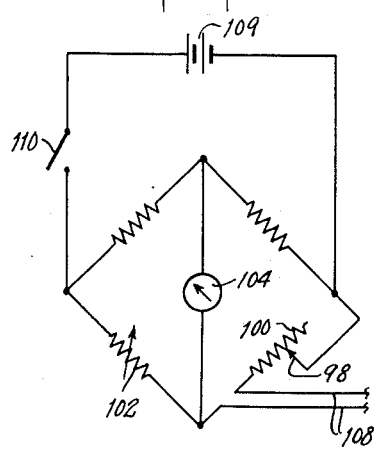
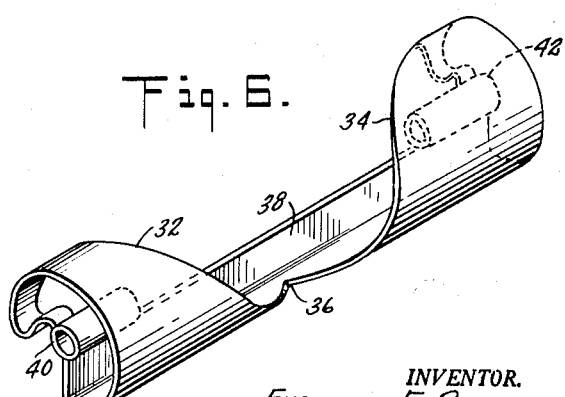

United States Patent Office 3,020,114
Patented Feb. 6, 1962

3,020,114
DEVICE FOR RECORDING BALANCE POINT OF ELECTRICAL BRIDGE CIRCUITS
Eustace Edgar Suckling, 21 Bellair Drive, Dobbs Ferry, N.Y.
Filed Nov. 9, 1960, Ser. No. 68,255
10 Claims. (Cl. 346—17)

This invention relates to mechanism for recording the balance point of a Wheatstone bridge circuit in measuring and recording instruments. More particularly, the invention relates to a mechanism for recording the balance point of a bridge circuit which records only the balance point of the circuit without recording the preliminary movement of the bridge balancing controls which take place during the process of rebalancing a bridge circuit which has been unbalanced.

The invention herein can be usefully employed in a large variety of measuring and recording instruments. However, since the invention was conceived in connection with temperature measuring and recording devices, a specific form of the invention illustrated and described herein by way of example will be the embodiment thereof in a temperature recording device.

It is not a difficult matter to set up a resistance measuring arrangement consisting of a Wheatstone bridge in which variations in the resistance of an element subjected to the force to be measured are compensated for by manual adjustment of a variable resistance. Such system enables the variable resistance control to be calibrated in terms such that by merely rebalancing the bridge, the measured force can be read off. If in a system of this kind the shaft of the balancing resistance is coupled to a stylus which leaves a mark on a paper chart, a record of the measured force is obtained. A system such as suggested, although easily constructed, is almost completely unsatisfactory by reason of the fact that in balancing a Wheatstone bridge, experimental movements of the control shaft must always be made until the balance point is found. If the preliminary or experimental motions of the control shaft are themselves recorded on the chart, it is difficult to differentiate between them and the true balance point which correctly signifies the measurement.

It is, therefore, the primary object of this invention to provide measuring and recording means using a Wheatstone bridge and recording chart in which only the true balance point of the bridge is recorded on the chart after the experimental motions associated with the balancing process have been completed.

It is a specific object of this invention to provide an improved temperature measuring and recording device in which a Wheatstone bridge is unbalanced by the variations of the temperature being measured, in which the variation in temperature is ascertained by manually bringing the bridge circuit into balance, and in which only the ultimate point of bridge rebalance is recorded.

Within recent years, it has become possible to obtain electrical resistance elements which have an extremely high coefficient of temperature and pressure dependence. Such elements have found common application in measuring instruments. Thermistors are elements of the class referred to which have application in temperature measuring systems such as the specific embodiment herein. Thermistors are semi-conductors usually made of metal oxides, such as nickel oxide or zinc oxide, or of various chlorides and sulphides. They are in the form of resistance elements whose value varies with the temperature such that the resistance descreases as the temperature rises, and vice versa.

Some of the systems employing devices of this category have been complex electronic arrangements in which a continuous record of the thermistor resistance is made on a moving chart. Others have been very simple systems which include a sensitive meter which measures a part or all of the current through the thermistor in a circuit so designed that the current depends on the thermistor resistance.

The first of these systems has the disadvantage of high cost and large size of the apparatus needed, while the second has the disadvantage that no fixed indication or permanent record is made of the temperature.

It is, therefore, the object of this invention to provide an electrical measuring system, including a temperature or pressure responsive element, which not only gives a static indication and a permanent record of the measurement being made but which is also extremely inexpensive to manufacture and which is very light and small in size.

Briefly, the invention in a specific application and in its most specific aspect consists of a normally balanced electric bridge circuit having therein a temperature-responsive element, such as a thermistor, adapted to unbalance the bridge circuit when the element is applied to a point whose temperature is to be measured. A meter is connected to the bridge circuit for indicating the balanced condition thereof and a manually operated variable resistance is embodied in the bridge circuit for rebalancing the same when it has been unbalanced by the temperature-responsive resistance.

A cam device having a center point is connected to the manual circuit balancing means for corresponding movement therewith, and a slidably mounted marking and indicating stylus having an operating element extending into the orbit of the cam device, but physically independent therefrom, is provided together with means for operating the cam device into engagement with the stylus operating element whereby the cam device displaces the stylus operating element into coincidence with the center point of the cam device. This results in the displacement of the stylus along a graduated temperature scale such that a static indication of the temperature results and a record of the temperature is obtained on a record sheet.

Since the stylus operating element is physically independent of the cam and is never brought into engagement with it until after the balancing process has been completed, the stylus at any time moves only from one balance point to another and the chart, therefore, is a true record of actual temperatures being measured.

The construction and operation of this invention herein will be further clarified and additional objects and advantages thereof will become apparent as the following detailed description thereof is read in light of the drawings forming a part hereof. In the drawings, like reference numerals indicate like parts, and:

FIG. 1 is a perspective view of the temperature measuring and recording device of the invention;

FIG. 2 is a plan view wherein a part of the cover has been broken away to show underlying parts;

FIG. 3 is an end elevational view, showing the cover removed;

FIG. 4 is a view from below, a substantial portion of the casing plate being broken away to show underlying structure;

FIG. 5 is a sectional view on line 5—5 of FIG. 4;

FIG. 6 is a perspective view of a scroll cam constituting one of the elements of the device; and FIG. 7 is a diagrammatic view of the electrical circuit embodied in the invention.

As best seen in FIG. 4, the illustrative mechanism herein is mounted in a chassis consisting of a pair of end walls 10 and 12 and a deck 14. The end walls 10 and 12 are interconnected at the back of the chassis by a rigid guide plate 16. The chassis is preferably a light-weight metal stamping. Mounted in the end walls 10 and 12 for rotation is a shaft 18. The shaft is designed to turn through an angular distance of 180° and is fixed against axial movement. The shaft 18 supports one end of a yoke 20. The yoke 20 has a pair of parallel ears 22 and 24 which are suitably apertured to receive the shaft 18. Extending forwardly from the base of the yoke 20 is a guide finger 26. The free end of the guide finger is adapted to engage under a guide strip 28 which is fixed to the underside of the deck in spaced relation thereto such that the finger 26 is firmly held thereunder but is nevertheless free to slide in the slot provided between the guide strip 28 and the underface of the deck 14. It will be seen, therefore, that the yoke structure 20 is free to move along the axis of the shaft 18.

Mounted between the ears of the yoke 20 is a scroll cam 30. This cam is a semi-cylindrical shell structure which has a pair of symmetrical cam surfaces 32 and 34. These surfaces terminate at a center point 36. The cam shell has a radial rib 38 which extends throughout the axial length of the cam. Secured to the shell and to the rib 38 are a pair of short bearing sections 40 and 42 which extend inwardly along the axis of the cam shell from the respective ends thereof for the purpose of forming a firm bearing surface with the shaft 18. It will be seen that the cam member 30, as shown in FIG. 4, is mounted between the ears 22 and 24 of the sliding yoke 20. It is evident, therefore, that as the yoke 20 is moved along the length of the shaft that the cam 30 will be similarly moved such that its center point 36 will be displaced along the length of the shaft 18 in the direction of yoke movement.

Displacement of the yoke 20 and a resulting displacement of the cam 30 along the length of the shaft 18 follows from rotation of a grooved reel 44. By continued reference to FIG. 4, it can be seen that the reel 44 is adapted to wind thereon a control cable 46 which has its ends attached to the yoke 20. The control cable 46 is attached to the reel 44 such that when the reel is turned, the cable attached to one side of the yoke 20 will be taken up while an equal amount of the control cable 46 attached to the opposite side of the yoke will be unreeled. The control cable 46 originating from the reel 44 passes about a rotary grooved guide pulley 48, then across the front of the chassis to a second rotary grooved guide pulley 50. From this point the cable is directed backwardly about a third rotary guide pulley 52 and from thence inwardly to an attaching lug 54 which is formed at the base of the yoke. The other end of the cable 46 is attached to a lug 56 at the base of the yoke 20 and from thence passes about a rotary guide pulley 58 and forwardly to the take-up reel 44. The take-up reel has a shaft 60 which extends through an outer casing 62 where an operating knob 64 is attached thereto. It can be seen that as the operating knob 64 is manually rotated the yoke 20 and consequently the scroll cam 30 will be moved along the shaft 18 in a direction depending on the rotation of the knob 64.

Mounted on the guide plate 16 at the back of the chassis, as best shown in FIGS. 4 and 5, is a sliding bracket 68 which has spaced pairs of guide flanges 70 and 72 extending rearwardly therefrom. The guide flanges 70 and 72 embrace the edges of the guide plate 16 such that the bracket 68 is held steady on the guide plate 16 but with sufficient freedom to move freely along the length of the guide plate. Extending upwardly from the bracket 68 is a stylus holder 74 which is adapted to hold a marking instrument such as a pencil 76. The holder 74 is curved forwardly so that the marking instrument 76 is substantially in contact with the deck of the chassis.

Extending forwardly from the bracket 68 is a stud 78. The stud is fixed to the bracket 68 and extends forward into the operating orbit of the scroll cam 30. The stud 78 extends forwardly between the symmetrical camming surfaces 32 and 34 of the cam. It can be seen, therefore, that if the scroll cam is displaced along the length of the shaft 18 such that its center point 36 does not coincide with the position of the stud 78 and if the cam is then rotated, one or the other of the cam surfaces 32 or 34 will engage the stud 78 and move the bracket 68 to coincide with the displaced center point 36 of the cam. It should be noted that the stud 78 extends into the operating orbit of the cam but that it has no physical connection therewith. This permits axial movement of the cam during the act of rebalancing the bridge without in any way disturbing the position of the stud and consequently without movement of the marking stylus.

Rotation of the scroll cam 30 through 180° is achieved by so rotating the shaft 18 by means of an operating handle 80 attached to an end of the shaft protruding from one side of the instrument casing.

By reference to FIGS. 4 and 5, it will be seen that the shaft 18 has attached thereto a saddle 82 which has a pair of upstanding legs 84 and 86 which embrace the rib 38 of the cam structure. It should be noted that the legs 84 and 86 are sufficiently spaced from the rib 38 to permit the rib to move freely in the saddle 82 as the cam is shifted along the shaft 18. However, when the shaft 18 is rotated, the legs of the saddle will engage the rib to impart similar rotation to the cam.

By reference to FIG. 3, it will be seen that the shaft 18 has an abutment 88 attached thereto. This abutment is adapted to engage a stop plate 90 fixed to the end wall 12 of the chassis. The inner end of the shaft 18 has a radially extending finger 92 attached thereto to accommodate one end of a spring 94. The spring 94 is attached to an anchor stud 96 extending outwardly from the wall 10 of the chassis. This arrangement insures that the shaft 18 will be normally rotated in a clockwise direction as viewed in FIG. 3 and that the abutment 88 will normally rest against the stop plate 90. This, through an agency of the saddle 82 will insure that the cam surfaces 32 and 34 of the scroll cam 30 will be properly positioned in angular rotation in respect to the stud 78 with the wide part of the cam slot at the plane of the stud.

The yoke 20 has fixed thereto a wiper 98 associated with a variable resistance 100 of an electric bridge circuit shown in FIG. 7. Movement of the yoke 20 along the shaft 18 is, therefore, effective to vary the resistance 100.

The bridge circuit of FIG. 7 includes a calibrating resistance 102 which can be adjusted such that the bridge is balanced for a preselected normal position of the wiper 98 along the resistance 100. This balanced condition of the circuit is indicated on a meter 104 which, as seen in FIG. 2, is visible through the top of the casing 62. A thermistor T is connected into the legs 100 and 102 of the bridge circuit. The thermistor T is at the end of a probe 106' attached to the end of a conductor 108 formed as part of the bridge circuit. The bridge circuit is energized by a battery 109 which is suitably removably clipped to any convenient part of the chassis. A circuit breaker 110 is provided to cut the battery 109 out of the bridge circuit when the device is not in use.

The thermistor T, as stated, is a resistance element whose value varies with temperature. If the temperature of the thermistor T is increased, its resistance decreases such that more current will flow through the resistance 100 of the bridge circuit. This unbalanced condition of the bridge will be indicated by the meter 104. After the bridge has been unbalanced by a change of thermistor temperature, the yoke 20 is moved along the shaft 18 and the position of the resistance wiper 98 is adjusted along the resistance 100 until the meter 104 indicates that the bridge circuit is again in balance. Such bridge adjustment results in the displacement of the center point 36 of the scroll cam in respect to the stud 76 of the stylus supporting bracket 68. If the operating handle 80 is now rotated in a counterclockwise direction through 180°, the scroll cam 30 will be rotated as explained above such that the stud 78 of the stylus bracket is brought into coincidence with the center point 36 of the cam structure. This will result in movement of the stylus bracket along the guide plate 16 such that the marking pencil 76 is moved along the graduations of a transparent face plate 106 constituting a window in the casing 62. The adjusted position of the pencil 76 will, therefore, reflect the temperature applied to the thermistor T.

The deck of the chassis has formed therein or has attached thereto a small paper roll holder 107 at a point above the face plate 106. A strip of paper 111 from a paper roll 112 in the paper roll holder 107 is provided for recording temperature changes. The face plate 106 is, therefore, sufficiently spaced from the deck 14 of the chassis to permit the paper strip 111 to be fed between the confronting surfaces of the face plate and the chassis. Suitable mechanism for automatically advancing the paper strip 111 at each operation of the operating handle 80 may be provided. Thus, in FIG. 3, the abutment 88 is adapted to engage a lever 114 which is connected to the side wall 12 of the chassis by a pivot 116. The lever is normally biased upwardly by a spring 118, so that its inner end normally engages the head of the abutment 88. The forwardly extending end of the lever 114 has pivoted thereto a pawl 120 which is biased into contact with a ratchet wheel 122 by means of a biasing spring 124. The ratchet wheel 122, as more clearly seen in FIG. 2, is fixed to a shaft 126 which extends across the path of the paper strip 111. The shaft is fixed for rotation in suitable journals such that a pair of rubber rollers 128 and 130 are in contact with the paper strip 111. With a construction such as described, operation of the lever 80 during the course of rotation of the scroll cam will also result in the feed of the paper strip 111 under the face plate 106. With the recording pencil 76 in contact with the paper strip, a continuous record of temperature changes may be obtained.

Because lever 80 is not rotated until the scroll cam has been moved to the position associated with bridge balance, stylus 76 moves only from one bridge balance point to another and does not reflect the experimental motions of knob 64 associated with finding the bridge balance adjustment.

The scroll cam 30 is well adapted to the mechanism because its operation is dependent on a simple rotary movement. However, other similar center point devices may be employed in place thereof. For example, it finds its full mechanical equivalent in a reciprocating fork having a pair of rearwardly diverging fingers adapted, when reciprocated, to engage the stud 78 and provide between them a center point for repositioning the stud and the stylus to indicate the position at which the bridge is rebalanced.

The invention is particularly adapted to the registration and recording of body temperatures. The conductor 108 is, therefore, sufficiently long to permit the probe 106 to be inserted into body orifices, while the instrument itself is at a convenient nearby location. A reel 132 is, therefore, provided to accommodate the necessary length of conductor. The reel is rotatably mounted on a shaft 134 which extends upwardly from the deck 14 of the chassis. The shaft 134 is adapted to extend upwardly through the instrument casing where an operating knob 136 is attached thereto to permit manual rotation of the reel 132. The inner ends of the conductor 108 are exposed and anchored in the upper flange of the reel such that a spring finger 138 is in constant contact with one of the bare conductor leads and forms a continuation thereof. In operation, the circuit breaker 110 is in contact with the other bare lead of the conductor thereby completing the bridge circuit. The circuit breaker 110 has a downwardly and inwardly disposed neck 140 which extends inwardly between the flanges of the reel 132. The neck 140 is so positioned that when the conductor 108 is completely reeled in, it will engage the neck 140 and lift the circuit breaker 110 from contact with the bare conductor on the flange of the reel, thus disconnecting the battery 109.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

I claim:

1. Means for recording the balance point of an electrical bridge circuit comprising, a normally balanced electrical bridge circuit having therein an element adapted to unbalance said circuit, a meter connected to said circuit for indicating the balanced condition thereof, manual means for electrically rebalancing said circuit when unbalanced by said element, a cam device having a center point, said cam device being connected to said manual circuit rebalancing means for corresponding movement therewith, a slidably mounted indicating stylus having an operating element extending into the orbit of said cam device, and means for operating said cam device into engagement with said operating element whereby said cam device displaces said operating element into coincidence with said center point of said cam.

2. Means for recording the balance point of an electrical bridge circuit comprising, a normally balanced electrical bridge circuit having therein an element adapted to unbalance said circuit, a meter connected to said circuit for indicating the balanced condition thereof, manual means for electrically rebalancing said circuit when unbalanced by said element, a cam device having a center point, said cam device being connected to said manual circuit rebalancing means for corresponding movement therewith, a slidably mounted indicating stylus, said stylus having an operating element extending into the orbit of said cam device but being physically independent thereof, and means for operating said cam device into engagement with said operating element whereby said cam device displaces said operating element into coincidence with said center point of said cam.

3. Means for recording the balance point of an electrical bridge circuit comprising, a normally balanced electrical bridge circuit having therein an element adapted to unbalance said circuit, a meter connected to said circuit for indicating the balanced condition thereof, manual means for electrically rebalancing said circuit when unbalanced by said element, a rotary scroll cam device having a center point, said scroll cam being connected to said manual circuit rebalancing means for corresponding movement therewith, a slidably mounted indicating sylus, said stylus having an operating element extending into the orbit of said scroll cam but being physically independent thereof, and means for rotating said scroll cam into engagement with said operating element whereby said cam device displaces said operating element into coincidence with said center point of said cam.

4. A recording device comprising, a normally balanced electrical bridge circuit having therein a force measuring element adapted to unbalance said circuit when said element is applied to a point to be measured, a meter connected to said circuit for indicating the balanced condition thereof, manual means for rebalancing said circuit when unbalanced by said element, a cam device having a center point, said cam device being connected to said manual circuit rebalancing means for corresponding movement therewith, a slidably mounted indicating stylus having an operating element extending into the orbit of said cam device, and means for operating said cam device into engagement with said operating element whereby said cam device displaces said operating element into coincidence with said center point of said cam.

5. A recording device comprising, a normally balanced electrical bridge circuit having therein a force measuring element adapted to unbalance said circuit when said element is applied to a point to be measured, a meter connected to said circuit for indicating the balanced condition thereof, manual means for rebalancing said circuit when unbalanced by said element, a rotary scroll cam device having a center point, said scroll cam device being connected to said manual circuit rebalancing means for corresponding movement therewith, a slidably mounted indicating stylus having an operating element extending into the orbit of said scroll cam device, and means for rotating said scroll cam device into engagement with said operating element whereby said cam device displaces said operating element into coincidence with said center point of said cam.

6. A recording device comprising, a normally balanced electrical bridge circuit having therein a force adapted to unbalance said circuit when said element is applied to a point to be measured, a meter connected to said circuit for indicating the balanced condition thereof, manual means for rebalancing said circuit when unbalanced by said element, a cam device having a center point, said cam device being connected to said manual circuit rebalancing means for corresponding movement therewith, a slidably mounted indicating stylus, said stylus having an operating element extending into the orbit of said cam device but being physically independent thereof, and means for operating said cam device into engagement with said operating element whereby said cam device displaces said operating element into coincidence with said center point of said cam.

7. A temperature indicating device comprising, a normally balanced electrical bridge circuit having therein a temperature-responsive element adapted to unbalance said circuit when said element is applied to a point whose temperature is to be measured, a meter connected to said circuit for indicating the balanced condition thereof, manual means for rebalancing said circuit when unbalanced by said element, a cam device having a center point, said cam device being connected to said manual circuit rebalancing means for corresponding movement therewith, a slidably mounted indicating stylus having an operating element extending into the orbit of said cam device, and means for operating said cam device into engagement with said operating element whereby said cam device displaces said operating element into coincidence with said center point of said cam.

8. A temperature indicating device comprising, a normally balanced electrical bridge circuit having therein a temperature-responsive element adapted to unbalance said circuit when said element is applied to a point whose temperature is to be measured, a meter connected to said circuit for indicating the balanced condition thereof, manual means for rebalancing said circuit when unbalanced by said element, a rotary scroll cam device having a center point, said scroll cam device being connected to said manual circuit rebalancing means for corresponding movement therewith, a slidably mounted indicating stylus having an operating element extending into the orbit of said scroll cam device, and means for rotating said scroll cam device into engagement with said operating element whereby said cam device displaces said operating element into coincidence with said center point of said cam.

9. A temperature indicating device comprising, a normally balanced electrical bridge circuit having therein a thermistor adapted to unbalance said circuit when said thermistor is applied to a point whose temperature is to be measured, a meter connected to said circuit for indicating the balanced condition thereof, manual means for rebalancing said circuit when unbalanced by said thermistor, a cam device having a center point, said cam device being connected to said manual circuit rebalancing means for corresponding movement therewith, a slidably mounted indicating stylus having an operating element extending into the orbit of said cam device, and means for operating said cam device into engagement with said operating element whereby said cam device displaces said operating element into coincidence with said center point of said cam.

10. A temperature indicating device comprising, a normally balanced electrical bridge circuit having therein a thermistor adapted to unbalance said circuit when said thermistor is applied to a point whose temperature is to be measured, a meter connected to said circuit for indicating the balanced condition thereof, manual means for rebalancing said circuit when unbalanced by said thermistor, a rotary scroll cam device having a center point, said scroll cam device being connected to said manual circuit rebalancing means for corresponding movement therewith, a slidably mounted indicating stylus having an operating element extending into the orbit of said scroll cam device, and means for rotating said scroll cam device into engagement with said operating element whereby said cam device displaces said operating element into coincidence with said center point of said cam.

No references cited.